United States Patent
Nagashima et al.

(10) Patent No.: US 8,144,322 B2
(45) Date of Patent: Mar. 27, 2012

(54) SPECTRAL CHARACTERISTIC MEASURING APPARATUS, METHOD FOR CALIBRATING SPECTRAL CHARACTERISTIC MEASURING APPARATUS, AND SPECTRAL CHARACTERISTIC MEASURING SYSTEM

(75) Inventors: Yoshiyuki Nagashima, Sakai (JP); Yasushi Goto, Sakai (JP); Kazuya Kiyoi, Tondabayashi (JP)

(73) Assignee: Konica Minolta Sensing, Inc., Osaka (JP)

( * ) Notice: Subject to any disclaimer, the term of this patent is extended or adjusted under 35 U.S.C. 154(b) by 403 days.

(21) Appl. No.: 12/584,207

(22) Filed: Sep. 1, 2009

(65) Prior Publication Data

US 2010/0067004 A1      Mar. 18, 2010

(30) Foreign Application Priority Data

Sep. 5, 2008    (JP) .................................. 2008-229015

(51) Int. Cl.
*G01J 3/28* (2006.01)

(52) U.S. Cl. ........................................ 356/326; 356/328

(58) Field of Classification Search ................. 356/326, 356/328
See application file for complete search history.

(56) References Cited

U.S. PATENT DOCUMENTS

2003/0011767 A1*    1/2003    Imura et al. .................... 356/326

FOREIGN PATENT DOCUMENTS

| JP | 62-284226 | 12/1987 |
| JP | 62-289736 | 12/1987 |

* cited by examiner

*Primary Examiner* — F. L. Evans
(74) *Attorney, Agent, or Firm* — Brinks Hofer Gilson & Lione

(57) ABSTRACT

A spectral characteristic measuring apparatus includes: an illuminating section for irradiating illumination light onto a sample; a spectral section for separating light from the sample irradiated with the illumination light into light rays in accordance with wavelengths; a light receiving section including a plurality of light receiving elements for receiving the light rays separated by the spectral section in accordance with wavelengths, and converting the received light rays into electrical output signals; and a storing section for storing a combined central wavelength of each of the light receiving elements calculated in advance based a spectral intensity distribution of the illumination light.

7 Claims, 13 Drawing Sheets

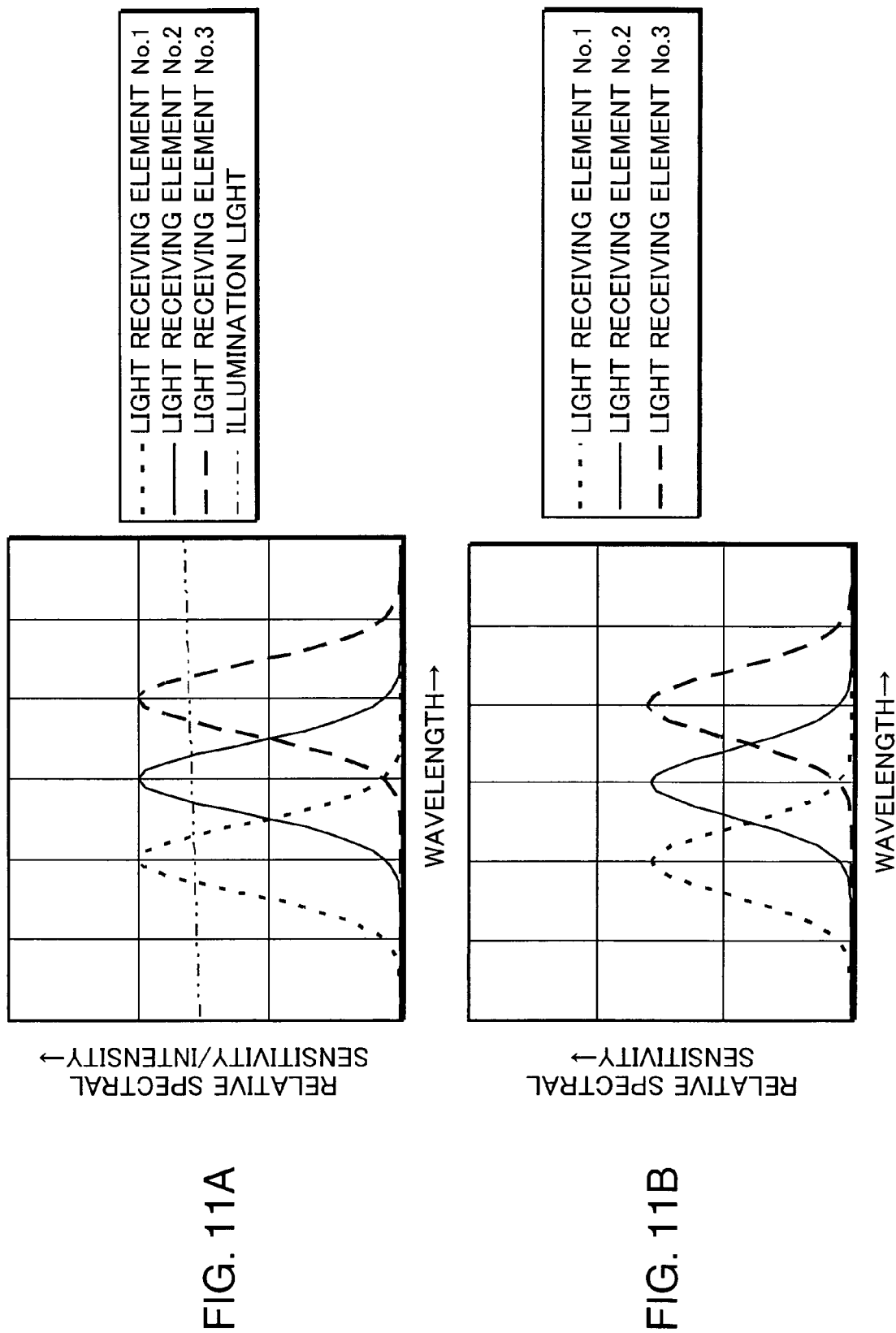

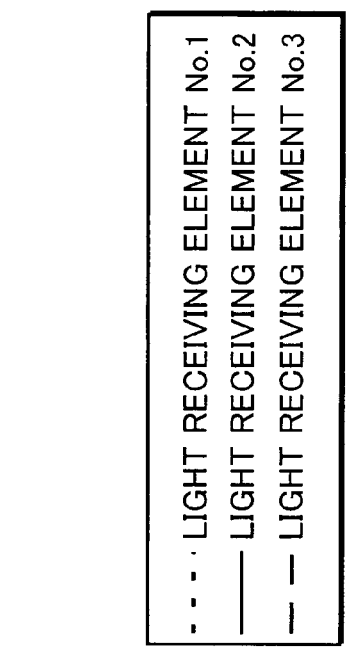
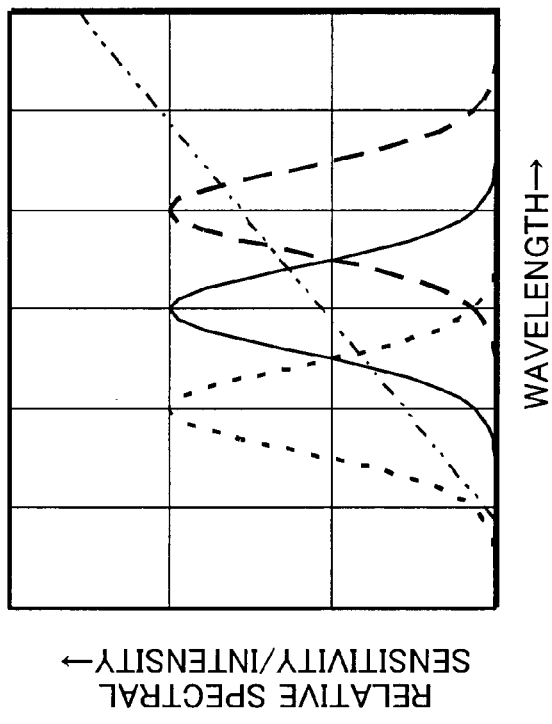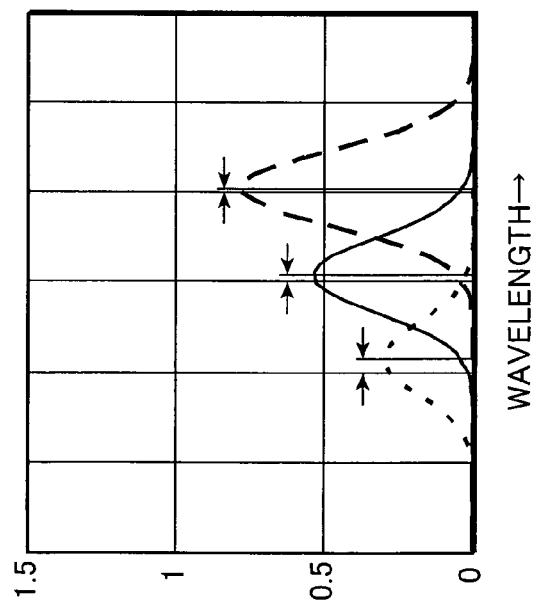
FIG. 12A
FIG. 12B

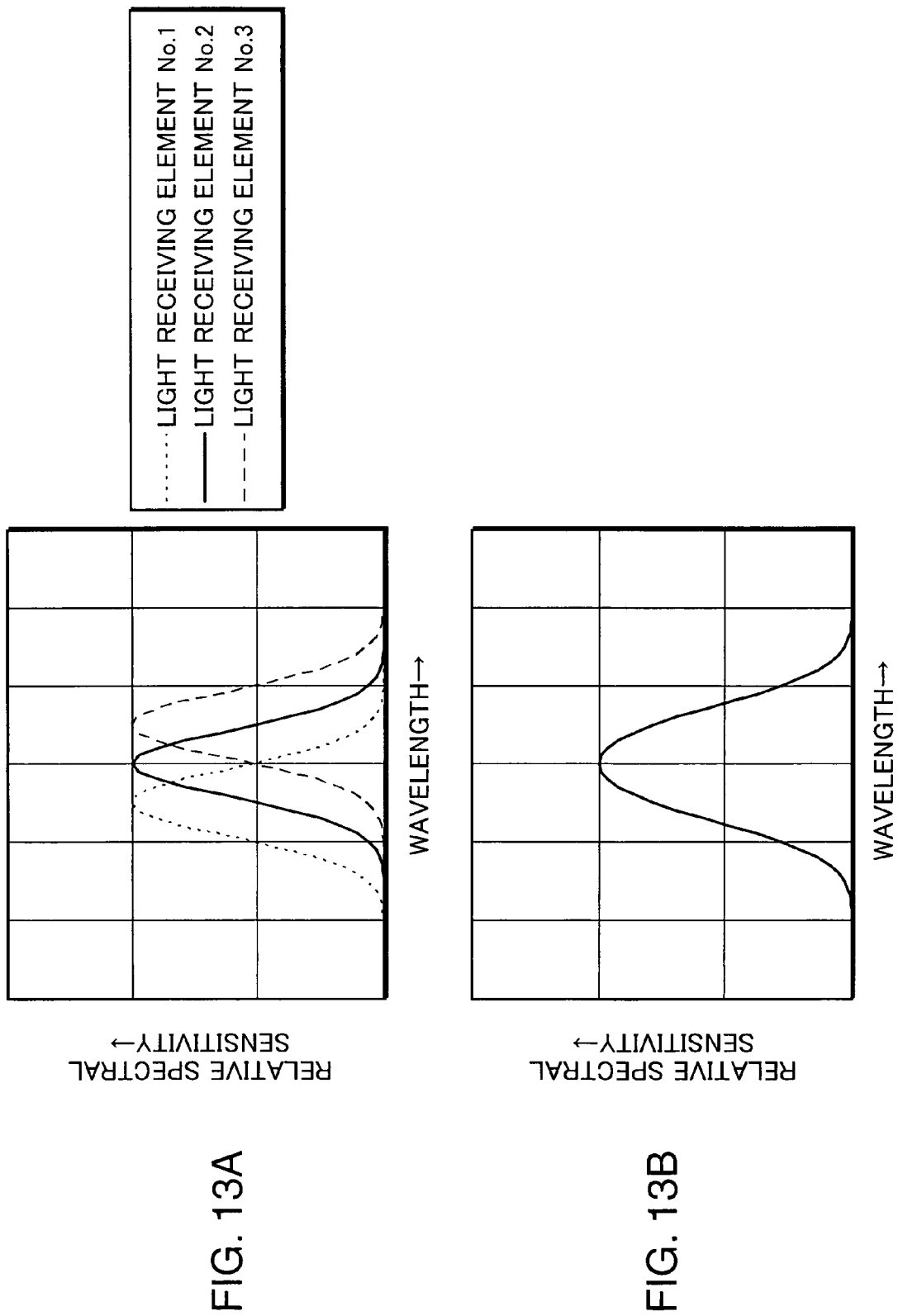

SPECTRAL CHARACTERISTIC MEASURING APPARATUS, METHOD FOR CALIBRATING SPECTRAL CHARACTERISTIC MEASURING APPARATUS, AND SPECTRAL CHARACTERISTIC MEASURING SYSTEM

This application is based on Japanese Patent Application No. 2008-229015 filed on Sep. 5, 2008, the contents of which are hereby incorporated by reference.

BACKGROUND OF THE INVENTION AND RELATED ART STATEMENT

1. Field of the Invention

The present invention relates to a spectral characteristic measuring apparatus such as a spectrocolorimeter for measuring a spectral characteristic of a sample to be measured (hereinafter, called as a sample), and a method for calibrating the spectral characteristic measuring apparatus. The present invention also relates to a spectral characteristic measuring system incorporated with a spectrocolorimeter or the like.

2. Description of the Related Art

Generally, a spectral characteristic measuring apparatus such as a spectrocolorimeter performs spectral measurement in a wavelength band from 400 nm to 700 nm or a measurement wavelength region slightly wider than the wavelength band, and at a half bandwidth or a wavelength pitch of 10 nm or 20 nm. Specifically, the spectral characteristic measuring apparatus is provided with a spectral section for separating light into light rays in accordance with wavelengths, and a light receiving section constituted of an array of light receiving elements for outputting electrical signals in accordance with an intensity of received light. The light rays separated by the spectral section in accordance with wavelengths are incident onto the respective light receiving elements, and electrical signals in accordance with the intensities of the light rays received on the light receiving elements are outputted from the light receiving elements.

In the spectral characteristic measuring apparatus, a performance error may occur at a production stage due to a variation in performance of the parts such as the spectral section and the light receiving elements. Further, arrangement positions of the parts or assembly error may be a factor of measurement error. Even if an identical sample is measured, measurement values to be obtained at a final stage may vary. In view of this, normally, spectral characteristic measuring apparatuses are individually calibrated before shipment.

Calibration of a spectral characteristic measuring apparatus is performed by obtaining spectral sensitivities of light receiving elements and storing the spectral sensitivities in the spectral characteristic measuring apparatus. At the time of measurement, accurate values are obtained by interpolating measurement values with use of the stored values. For instance, in calibration at the time of shipment, central wavelengths of the light receiving elements are obtained and stored in the spectral characteristic measuring apparatus. Then, at the time of measurement, performing a computation based on measurement values obtained by the measurement and the stored central wavelengths enables to obtain an accurate spectral reflection characteristic of a sample.

In the following, there is described a method for obtaining central wavelengths of the light receiving elements in calibration. Specifically, monochromatic light rays of different wavelengths are successively incident onto a spectral characteristic measuring apparatus by a spectral illuminator capable of outputting monochromatic light rays each having a sufficiently small half bandwidth at each of wavelengths, and electrical signals to be outputted from the light receiving elements are plotted. Thereby, central wavelengths of the light receiving elements are obtained. Each of the central wavelengths may be defined as a centroid or a peak of a spectral sensitivity characteristic of each of the light receiving elements.

For instance, patent document 1 recites an arrangement, wherein central wavelengths are obtained in calibration, integrated values of spectral sensitivities in a range including each central wavelength as a reference value are stored, and a computation is performed using measurement values obtained by measurement and the stored values to improve precision on measurement values. Patent document 2 recites an arrangement, wherein a central wavelength (a peak wavelength) of each of the light receiving elements is obtained and stored in advance in calibration, and measurement values obtained by measurement are subjected to interpolation based on the central wavelengths to improve precision on measurement values.

Patent document 1: JP Sho 62-289736A
Patent document 2: JP Sho 62-284226A

Conventionally, a xenon lamp, a tungsten lamp, or a like device has been used as an illuminating section in a spectral characteristic measuring apparatus. In recent years, a white LED (Light Emitting Diode) or a like device has been used as an illuminating section, in place of a xenon lamp or a tungsten lamp. Whereas a spectral intensity distribution of a xenon lamp or a tungsten lamp with respect to wavelengths is relatively flat, a spectral intensity distribution of a white LED with respect to wavelengths is sharp. In the specification, a flat spectral intensity distribution means a small change in spectral intensity between adjacent wavelengths of a light receiving element array; and a sharp spectral intensity distribution means a large change in spectral intensity between adjacent wavelengths of a light receiving element array.

The above feature is described in detail referring to FIGS. 9 and 10. FIG. 9 is a graph showing a spectral intensity distribution of a tungsten lamp with respect to wavelengths. FIG. 10 is a graph showing a spectral intensity distribution of a white LED with respect to wavelengths. Referring to FIGS. 9 and 10, the axis of abscissa indicates a wavelength, and the axis of ordinate indicates a relative spectral intensity. As shown in FIG. 9, as the wavelength of light from the tungsten lamp is increased, the relative spectral intensity of light from the tungsten lamp is increased. However, there is no specific portion where the relative spectral intensity of light from the tungsten lamp is sharply increased. The relative spectral intensity of light from the tungsten lamp is monotonously increased. Thus, it is conceived that the spectral intensity distribution of the tungsten lamp is substantially flat.

On the other hand, in the example shown in FIG. 10, the spectral intensity distribution of the white LED has two peaks substantially in the same wavelength band as FIG. 9. In other words, the spectral intensity distribution of the white LED has plural spectral intensity peaks in a predetermined wavelength band, i.e. a portion where the spectral intensity is sharply increased and a portion where the spectral intensity is sharply decreased with respect to wavelengths, as compared with the spectral intensity distribution of the tungsten lamp shown in FIG. 9. Thus, it is conceived that the spectral intensity distribution of the white LED shown in FIG. 10 is sharp.

In a spectral characteristic measuring apparatus, light reflected from a sample irradiated with illumination light is separated in accordance with wavelengths for measurement. Accordingly, measurement values contain a characteristic of the illumination light. In the case where a tungsten lamp is used as an illuminating section as in the conventional art, it is possible to determine spectral sensitivities of the light receiving elements of the light receiving section of the spectral characteristic measuring apparatus in consideration of the performance of the light receiving elements only. However, as described above, in the case where a white LED having a sharp spectral intensity distribution with respect to wavelengths is used as an illuminating section, spectral sensitivities of the light receiving elements are strongly influenced by the spectral intensity distribution of the illumination light from the illuminating section. In the following, an influence of illumination light on spectral sensitivities is described.

Spectral sensitivities in a spectral characteristic measuring apparatus are described referring to FIGS. 11A through 14B. FIGS. 11A and 11B are graphs showing spectral sensitivities of light receiving elements, in the case where a tungsten lamp is used as an illuminating section. FIG. 11A is a graph showing spectral sensitivities of light receiving elements, and a spectral intensity distribution of illumination light. FIG. 11B is a graph showing combined sensitivities of the light receiving elements. FIGS. 12A and 12B are graphs showing spectral sensitivities of light receiving elements, in the case where a white LED is used as an illuminating section. FIG. 12A is a graph showing spectral sensitivities of light receiving elements, and a spectral intensity distribution of illumination light. FIG. 12B is a graph showing combined sensitivities of the light receiving elements. FIGS. 13A and 13B are graphs showing spectral sensitivities of light receiving elements, in the case where a tungsten lamp is used as an illuminating section. FIG. 13A is a graph showing combined spectral sensitivities of light receiving elements. FIG. 13B is a graph showing a weighted combined sensitivity. FIGS. 14A and 14B are graphs showing spectral sensitivities, in the case where a white LED is used as an illuminating section. FIG. 14A is a graph showing combined spectral sensitivities of light receiving elements, and FIG. 14B is a graph showing a weighted combined sensitivity. In FIGS. 11A through 14B, the axis of abscissa indicates a wavelength, and the axis of ordinate indicates a relative spectral sensitivity of each of the light receiving elements, or a relative spectral intensity of illumination light. In FIGS. 11A, 11B, 12A, and 12B, the light receiving elements No. 1 through No. 3 respectively indicate three light receiving elements arranged adjacent to each other, wherein the light receiving elements No. 1 through No. 3 are arranged in this order.

In the case where a tungsten lamp is used as an illuminating section, spectral sensitivities of the light receiving elements, and a spectral intensity distribution of illumination light, as shown in FIG. 11A, are obtained. As shown in FIG. 11A, the spectral intensity distribution of the illumination light from the tungsten lamp is substantially flat. Further, the spectral sensitivities of the light receiving elements shown in FIG. 11A are values free from an influence of illumination light. Since illumination light affects spectral sensitivities in actual measurement, combined sensitivities of the light receiving elements in actual measurement show the values as shown in FIG. 11B. Specifically, each of the combined sensitivities is obtained by multiplying a spectral sensitivity of each of the light receiving elements with a spectral intensity of illumination light. As is obvious from comparison between FIGS. 11A and 11B, central wavelengths of the light receiving elements No. 1 through No. 3 are substantially the same between the graphs of FIGS. 11A and 11B.

In the case where a white LED is used as an illuminating section, spectral sensitivities of light receiving elements and a spectral intensity distribution of illumination light, as shown in FIG. 12A, are obtained. As shown in FIG. 12A, the spectral intensity distribution of the illumination light from the white LED is sharp, and a gradient thereof is large, as compared with the case of the tungsten lamp. Similarly to the graph of FIG. 11A, the spectral sensitivities of light receiving elements shown in FIG. 12A are values free from an influence of illumination light. FIG. 12B shows values of combined sensitivities including an influence of the illumination light. As is obvious from comparison between FIGS. 12A and 12B, central wavelengths of the light receiving elements No. 1 through No. 3 are displaced from each other between the graphs of FIGS. 12A and 12B. Specifically, in the case where the spectral intensity of the illumination light is sharply increased, as the wavelength is increased, the central wavelengths of the light receiving elements No. 1 through No. 3 based on combined sensitivities are increased, as compared with the central wavelengths calculated solely based on the performance of the light receiving elements.

As described above, in the case where a tungsten lamp is used as an illuminating section, there is no or less influence of illumination light. However, in the case where a white LED or a like device having a sharp spectral intensity distribution with respect to wavelengths is used as an illuminating section, it is difficult to obtain accurate measurement values by storing central wavelengths free from an influence of illumination light, and interpolating measurement values with use of the stored central wavelengths.

There is also proposed a method for improving precision on spectral sensitivities of light receiving elements, and improving the S/N ratio by performing a weighting calculation with respect to spectral sensitivities of a certain light receiving element and light receiving elements adjacent thereto. In performing this method, in the case where a tungsten lamp is used as an illuminating section, spectral sensitivities of a middle light receiving element (light receiving element No. 2) and the light receiving elements (light receiving elements No. 1 and No. 3) adjacent to the middle light receiving element, as shown in FIG. 13A, are obtained. The combined sensitivities of the light receiving elements shown in FIG. 13A correspond to the combined sensitivities of the light receiving elements shown in FIG. 11B. As shown in FIG. 13A, since the combined sensitivities of the light receiving elements No. 1 and No. 3 adjacent to the light receiving element No. 2 are substantially identical to each other, weighting coefficients to be applied to the light receiving elements No. 1 and No. 3 for weighting calculation may be identical to each other. Performing a weighting calculation by using the combined sensitivities of the light receiving elements No. 1 through No. 3 shown in FIG. 13A enables to obtain a weighted combined sensitivity as shown in FIG. 13B. As is obvious from comparison between FIGS. 13A and 13B, the combined central wavelength shown in FIG. 13B is substantially the same as the combined central wavelength of the light receiving element No. 2 shown in FIG. 13A, and there is substantially no displacement between the combined central wavelengths in FIGS. 13A and 13B. The combined central wavelength is a central wavelength of a light receiving element calculated based on a combined sensitivity.

Next, described is a case where a white LED is used as an illuminating section. In the case where a white LED is used as an illuminating section, combined sensitivities of the middle light receiving element (light receiving element No. 2), and the light receiving elements (light receiving elements No. 1 and No. 3) adjacent to the middle light receiving element, as shown in FIG. 14A, are obtained. The combined sensitivities of the light receiving elements shown in FIG. 14A correspond to the combined sensitivities of the light receiving elements shown in FIG. 12B. Performing a weighting calculation with respect to the combined sensitivities of the light receiving elements shown in FIG. 14A, using proper weighting coefficients enables to obtain a weighted combined sensitivity shown in FIG. 14B. As is obvious from comparison between FIGS. 14A and 14B, the combined central wavelength shown in FIG. 14B is larger than the central wavelength of the light receiving element No. 2 shown in FIG. 14A, and is displaced from the central wavelength of the light receiving element No. 2 shown in FIG. 14A.

Thus, in the case where a white LED is used as an illuminating section, in place of a tungsten lamp, since an influence of illumination light from the white LED is involved in actual spectral characteristic measurement, as described above, it is impossible to obtain accurate measurement values by: obtaining central wavelengths solely based on spectral sensitivities of the light receiving elements free from an influence of illumination light; and interpolating measurement values using the central wavelengths at the time of measurement.

SUMMARY OF THE INVENTION

In view of the above, it is an object of the present invention to provide a spectral characteristic measuring apparatus which can perform an improved measurement of a spectral characteristic of a sample, a method for accurately calibrating the spectral characteristic measuring apparatus, and a spectral characteristic measuring system capable of accurately measuring a spectral characteristic of a sample.

According to an aspect of the invention, a spectral characteristic measuring apparatus includes: an illuminating section for irradiating illumination light onto a sample; a spectral section for separating light from the sample irradiated with the illumination light into light rays in accordance with wavelengths; a light receiving section including a plurality of light receiving elements for receiving the light rays separated by the spectral section in accordance with wavelengths, and converting the received light rays into electrical output signals; and a storing section for storing a combined central wavelength of each of the light receiving elements calculated in advance based a spectral intensity distribution of the illumination light.

The above arrangement enables to provide a spectral characteristic measuring apparatus which can perform an accurate measurement.

These and other objects, features and advantages of the present invention will become more apparent upon reading the following detailed description along with the accompanying drawings.

BRIEF DESCRIPTION OF THE DRAWINGS

FIGS. 11A and 11B are graphs showing spectral sensitivities of light receiving elements in the case where a tungsten lamp is used as an illuminating section, wherein FIG. 11A is a graph showing spectral sensitivities of light receiving elements, and a spectral intensity distribution of illumination light, and FIG. 11B is a graph showing combined sensitivities of the light receiving elements.

FIGS. 12A and 12B are graphs showing spectral sensitivities of light receiving elements in the case where a white LED is used as an illuminating section, wherein FIG. 12A is a graph showing spectral sensitivities of light receiving elements, and a spectral intensity distribution of illumination light, and FIG. 12B is a graph showing combined sensitivities of the light receiving elements.

FIGS. 13A and 13B are graphs showing spectral sensitivities of light receiving elements in the case where a tungsten lamp is used as an illuminating section, wherein FIG. 13A is a graph showing combined sensitivities of light receiving elements, and FIG. 13B is a graph showing a weighted combined sensitivity.

FIGS. 14A and 14B are graphs showing spectral sensitivities of light receiving elements in the case where a white LED is used as an illuminating section, wherein FIG. 14A is a graph showing combined sensitivities of light receiving elements, and FIG. 14B is a graph showing a weighted combined sensitivity.

DETAILED DESCRIPTION OF THE PREFERRED EMBODIMENTS OF THE INVENTION

Figure 1:
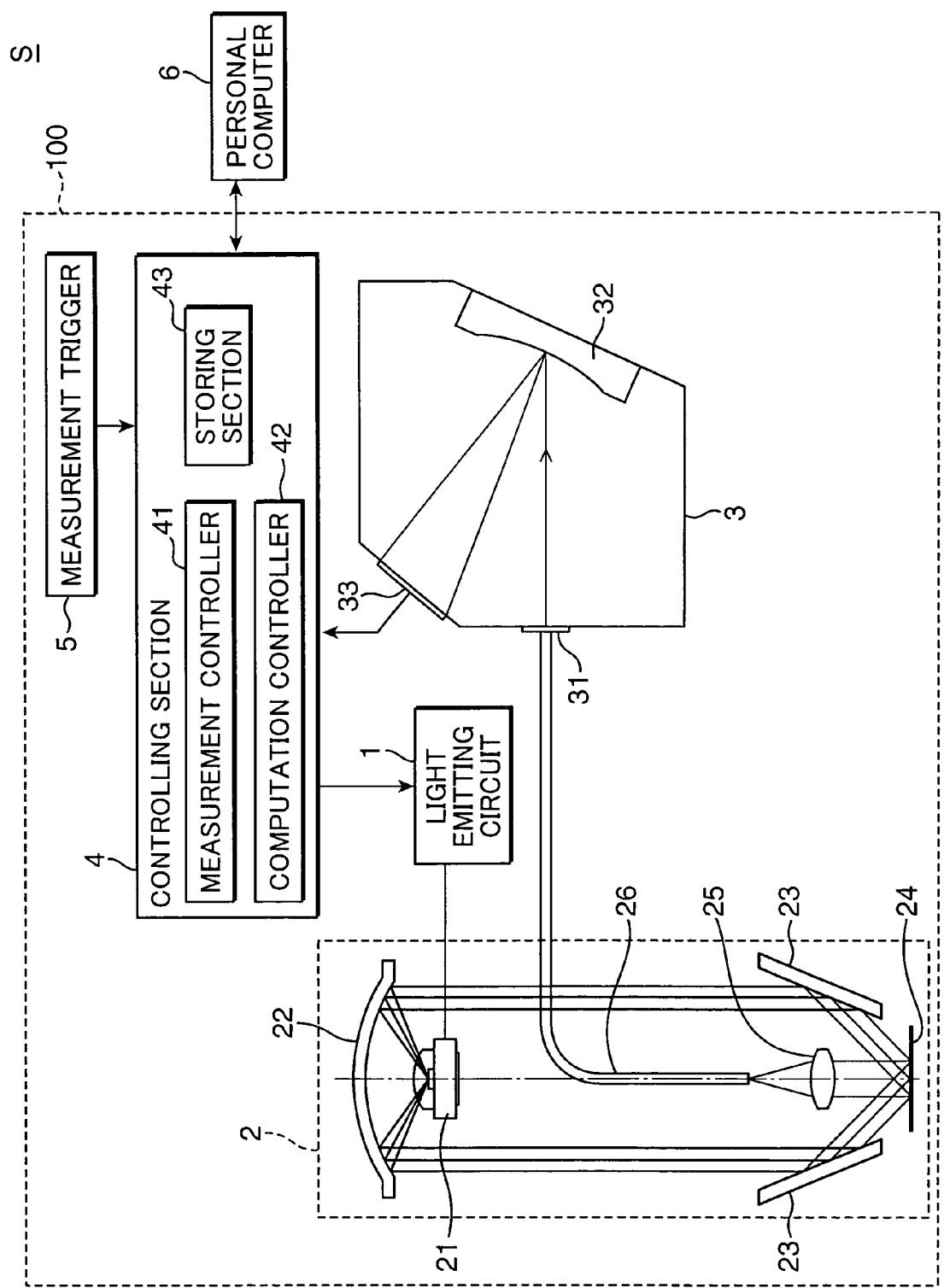
FIG. 1 is a diagram showing an arrangement of a spectral characteristic measuring system in accordance with a first embodiment of the invention.

In the following, embodiments of the invention are described referring to the drawings. Elements having like reference numerals throughout the drawings have like arrangements, and repeated description thereof is omitted herein.

First Embodiment

A spectral characteristic measuring system in accordance with a first embodiment of the invention is described. First, an arrangement of the spectral characteristic measuring system in accordance with the first embodiment is described.

Figure 2:
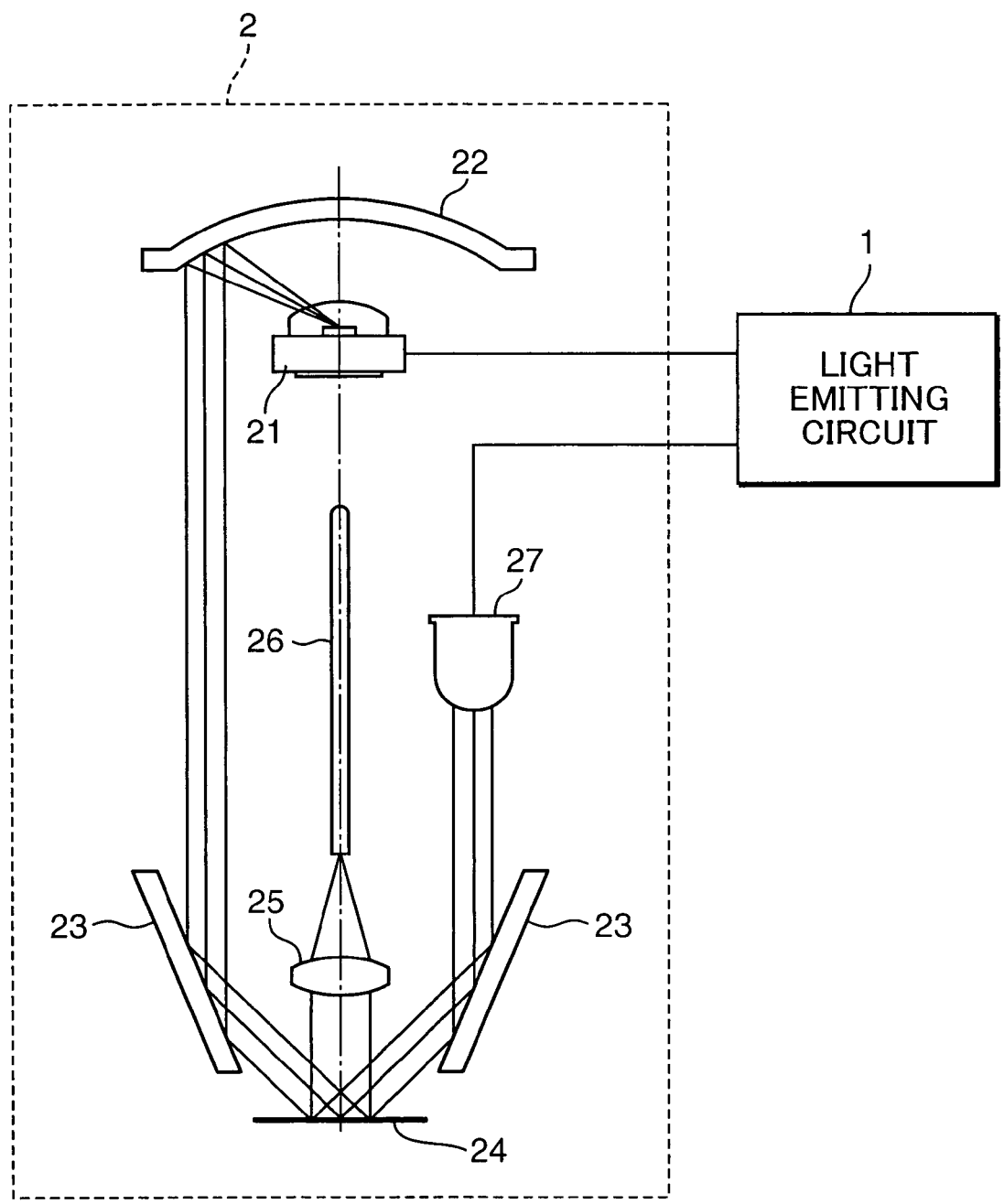
FIG. 2 is a side view showing an arrangement of a measuring section of a spectral characteristic measuring apparatus of the first embodiment.
Figure 3:
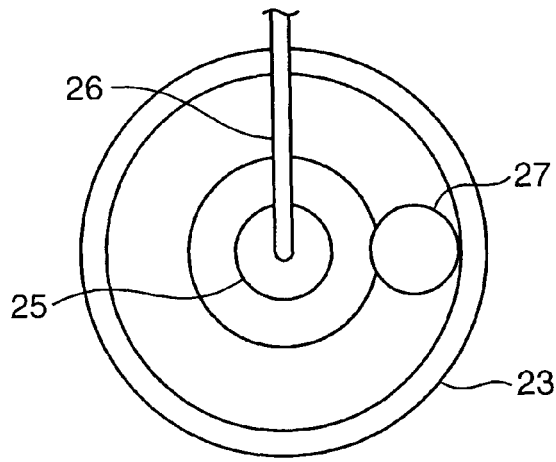
FIG. 3 is a top plan view showing an arrangement of a lower part of the measuring section of the spectral characteristic measuring apparatus, the lower part being below a white LED.

Referring to FIGS. 1 to 3, a spectral characteristic measuring system S of the first embodiment includes a spectral characteristic measuring apparatus 100, and a personal computer 6 as a computing section. The spectral characteristic measuring apparatus 100 includes a light emitting circuit 1, a measuring section 2, a spectral measuring section 3, a controlling section 4, and a measurement trigger 5. In this embodiment, the spectral characteristic measuring apparatus 100 is a spectral colorimeter for analyzing the color of a sample 24. The personal computer 6 is operable to compute and display measurement values of the sample 24 measured by the spectral characteristic measuring apparatus 100.

The light emitting circuit 1 is a circuit for turning on a white LED 21 and the purple LED 27 as an illuminating section provided in the measuring section 2. The light emitting circuit 1 is constituted of electronic circuit components.

The measuring section 2 includes the white LED 21 as the illuminating section, a reflection mirror 22 disposed above the white LED 21, a toroidal mirror 23, the sample 24, a lens 25, an optical fiber 26, and the purple LED 27.

The white LED 21 serves as the illuminating section, and emits white light for illuminating the sample 24. The reflection mirror 22 reflects annular white light emitted from the white LED 21, and guides the white light to the toroidal mirror 23. The toroidal mirror 23 is an aspherical reflection mirror having different curvatures in horizontal and vertical directions. The toroidal mirror 23 has an effect of uniformly irradiating light from a point light source onto the entirety of a sample with, as compared with a spherical mirror. The toroidal mirror 23 is operable for a wide wavelength region from a ultraviolet wavelength band to an infrared wavelength band. Specifically, the toroidal mirror 23 reflects annular white light from the reflection mirror 22, reflects one-directional purple light from the purple LED 27, and guides the white light and the purple light to the sample 24 for irradiation. The purple LED 27 is provided to supplement illumination light from the white LED 21. Specifically, white light to be emitted from the white LED 21 has a relatively low energy of a short wavelength (about 420 nm). In view of this, illumination light is supplemented by purple light having a short wavelength energy to be emitted from the purple LED 27, e.g. purple light whose primary wavelength is 410 nm. The sample 24 is an object to be measured. White light and purple light reflected on the toroidal mirror 23 are irradiated onto the sample 24 and reflected thereon. The lens 25 is disposed above the sample 24. The lens 25 condenses reflection light from the sample 24, and combines the condensed light into the optical fiber 26. The optical fiber 26 guides the light (reflection light) from the sample 24 to the spectral measuring section 3.

The spectral measuring section 3 includes an incident slit 31, a diffraction grating 32 as a spectral section, and a light receiving line sensor 33 as a light receiving section, which is constituted of light receiving elements arranged in a line. The incident slit 31 is adapted to allow incidence of light guided from the sample 24 through the optical fiber 26 into the spectral measuring section 3. The diffraction grating 32 separates a light flux from the sample 24 into light rays in accordance with wavelengths through the incident slit 31. Specifically, light incident onto the diffraction grating 32 is reflected in different directions in accordance with wavelengths. Accordingly, light rays of different wavelengths are successively reflected in respective individual directions. In the first embodiment, a reflective diffraction grating is used as the diffraction grating 32. Alternatively, for instance, a transmissive diffraction grating may be used. The light receiving line sensor 33 is constituted of the light receiving elements arranged in a certain direction, and the arranged direction of the light receiving elements is identical to the direction along which light is separated by the diffraction grating 32. In this arrangement, light rays of different wavelengths separated by the diffraction grating 32 are incident onto the light receiving elements. Upon incidence of the light rays, each of the light receiving elements outputs an electrical signal in accordance with the intensity of received light. In this embodiment, one hundred and twenty-eight light receiving elements are arranged, and the measurement pitch is set to 4 nm. The outputted electrical signals are sent to the controlling section 4.

The controlling section 4 is constituted of various electronic parts, integrated circuit parts, and a CPU (Central Processing Unit). The controlling section 4 includes a measurement controller 41 for controlling the respective parts of the spectral characteristic measuring apparatus 100 to perform respective predetermined operations, and a computation processor 42 for performing various computations based on electrical signals from the spectral measuring section 3. The controlling section 4 further includes a storing section 43 such as an ROM (Read Only Memory) for storing a program relating to a computing operation and a controlling operation of the spectral characteristic measuring apparatus 100, calibration data which have been acquired in advance at the time of shipment, and the like, an EEPROM (Electrically Erasable Programmable ROM), a non-volatile memory such as a flash memory, or an RAM (Random Access Memory) for temporarily storing data.

The measurement trigger 5 is a switch for allowing a user to designate start of measuring a spectral characteristic of the sample 24.

The personal computer 6 is an external device of the spectral characteristic measuring apparatus 100, and is connected to the spectral characteristic measuring apparatus 100 via an interface such as a USB. The personal computer 6 includes a CPU for performing computations, and a storing section such as an ROM, an EEPROM, an RAM, or a flash memory. Although not illustrated, the personal computer 6 includes a display device such as an LCD (Liquid Crystal Display), an organic electroluminescence display device, or a CRT (Cathode-Ray Tube) display device for monitoring a measurement result. The personal computer 6 is constructed in such a manner that an auxiliary recording medium such as a CD-ROM (Compact Disc Read Only Memory) or a memory card is detachably mountable, data is readable from the auxiliary recording medium, and data is writable into the auxiliary recording medium. Thereby, data necessary for computation is readable from the auxiliary recording medium by mounting the auxiliary recording medium recorded with data to be used in computation by the personal computer 6 on the personal computer 6, or data computed by the personal computer 6 is storable in the auxiliary recording medium. The personal computer 6 supplements the operation of the spectral characteristic measuring apparatus 100, such as computation of measurement values, and display of a measurement result.

Figure 4:
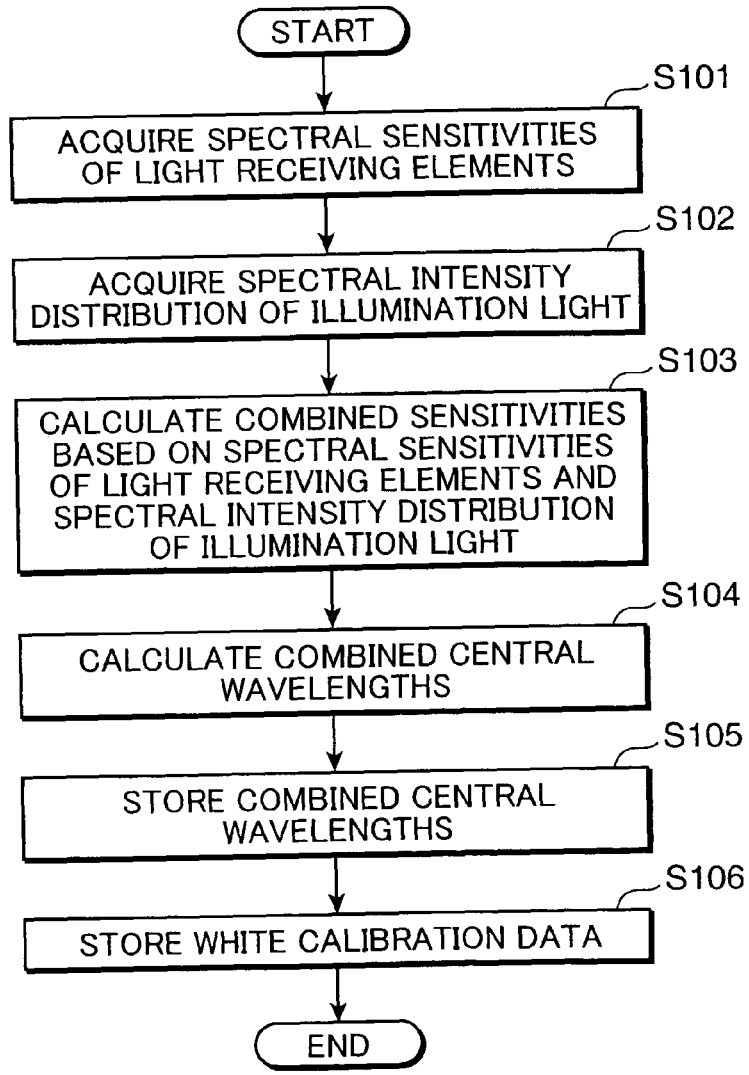
FIG. 4 is a flowchart showing a method for calibrating the spectral characteristic measuring apparatus.

Next, a method for calibrating the spectral characteristic measuring apparatus 100 of the first embodiment at the time of shipment is described referring to FIG. 4. FIG. 4 is a flowchart showing a method for calibrating the spectral characteristic measuring apparatus 100 of the first embodiment. Similarly to the conventional method, first, spectral sensitivities of the light receiving elements of the light receiving line sensor 33 free from an influence of illumination light are acquired (Step S101). Specifically, monochromatic light rays of respective wavelength components are successively outputted to the spectral measuring section 3 by a spectral illuminator capable of outputting monochromatic light rays each having a sufficiently small half bandwidth. Each of the monochromatic light rays is reflected on the diffraction grating 32 at a different angle in accordance with wavelengths, and irradiated onto each of the light receiving elements of the light receiving line sensor 33. Upon irradiation of the monochromatic light rays, the light receiving elements successively output electrical signals. Spectral sensitivities of the light receiving elements are obtained by plotting the electrical signals to be outputted from the light receiving line sensor 33.

Then, a spectral intensity distribution of illumination light is acquired (Step S102). Specifically, a spectral intensity distribution of illumination light with respect to wavelengths are obtained by measuring illumination light to be emitted from the white LED 21 and the purple LED 27, with use of a spectroradiometer or a like device.

Then, combined sensitivities including the spectral sensitivities of the light receiving elements and the spectral intensity distribution of the illumination light are calculated based on the spectral sensitivities of the light receiving elements and the spectral intensity distribution of the illumination light by implementing the equation (1) (Step S103).

$$f_n(\lambda)=I_n(\lambda) \times D_n(\lambda) \tag{1}$$

where $fn(\lambda)$ is a combined sensitivity of the n-th light receiving element, $I_n(\lambda)$ is a spectral intensity of illumination light to be incident onto the n-th light receiving element, and $D_n(\lambda)$ is a spectral sensitivity of the n-th light receiving element.

In the case where the light receiving line sensor 33 is constituted of one hundred and twenty-eight light receiving elements, "n" is an integer from 1 to 128.

Specifically, combined sensitivities of the light receiving elements of the spectral characteristic measuring apparatus 100 are obtained by multiplying a spectral sensitivity of each of the light receiving elements with a spectral intensity of illumination light. Then, central wavelengths (combined central wavelengths) of the light receiving elements are calculated, using the calculated combined sensitivities (Step S104). A centroid of a spectral sensitivity characteristic of each of the light receiving elements may be defined as the central wavelength of the each light receiving element. The central wavelengths of the light receiving elements are expressed by the equation (2).

$$\lambda g = \int (\lambda \cdot S(\lambda)) d\lambda / \int S(\lambda) d\lambda \tag{2}$$

where $\lambda g$ is a central wavelength corresponding to a centroid, $\lambda$ is a wavelength, and $S(\lambda)$ is a combined sensitivity at the wavelength $\lambda$.

The central wavelengths of the light receiving elements are calculated by a device for adjusting the spectral characteristic measuring apparatus 100. An example of the device for adjusting the spectral characteristic measuring apparatus 100 is a personal computer.

The calculated central wavelengths of the light receiving elements are stored in the storing section 43 as one of calibration data (Step S105). The central wavelengths are calculated by the computation processor 42.

Then, white calibration data as data for calibration is stored in the storing section 43 (Step S106). The white calibration data is not data inherent to individual spectral characteristic measuring apparatuses, but is data inherent to individual white calibration plates.

Alternatively, calculated central wavelengths or white calibration data may be stored in an auxiliary recording medium via the personal computer 6. Specifically, the spectral characteristic measuring apparatus 100 and an auxiliary recording medium recorded with data relating to combined central wavelengths may constitute a measuring system.

Calibration of the spectral characteristic measuring apparatus 100 before shipment is completed by performing the above steps. As described above, in the spectral characteristic measuring apparatus 100 of the first embodiment, calibration data is stored in the storing section 43. The calibration data includes data relating to combined central wavelengths of the light receiving elements, which have been calculated based on a spectral intensity distribution of illumination light with respect to wavelengths, and white calibration data.

Figure 5:
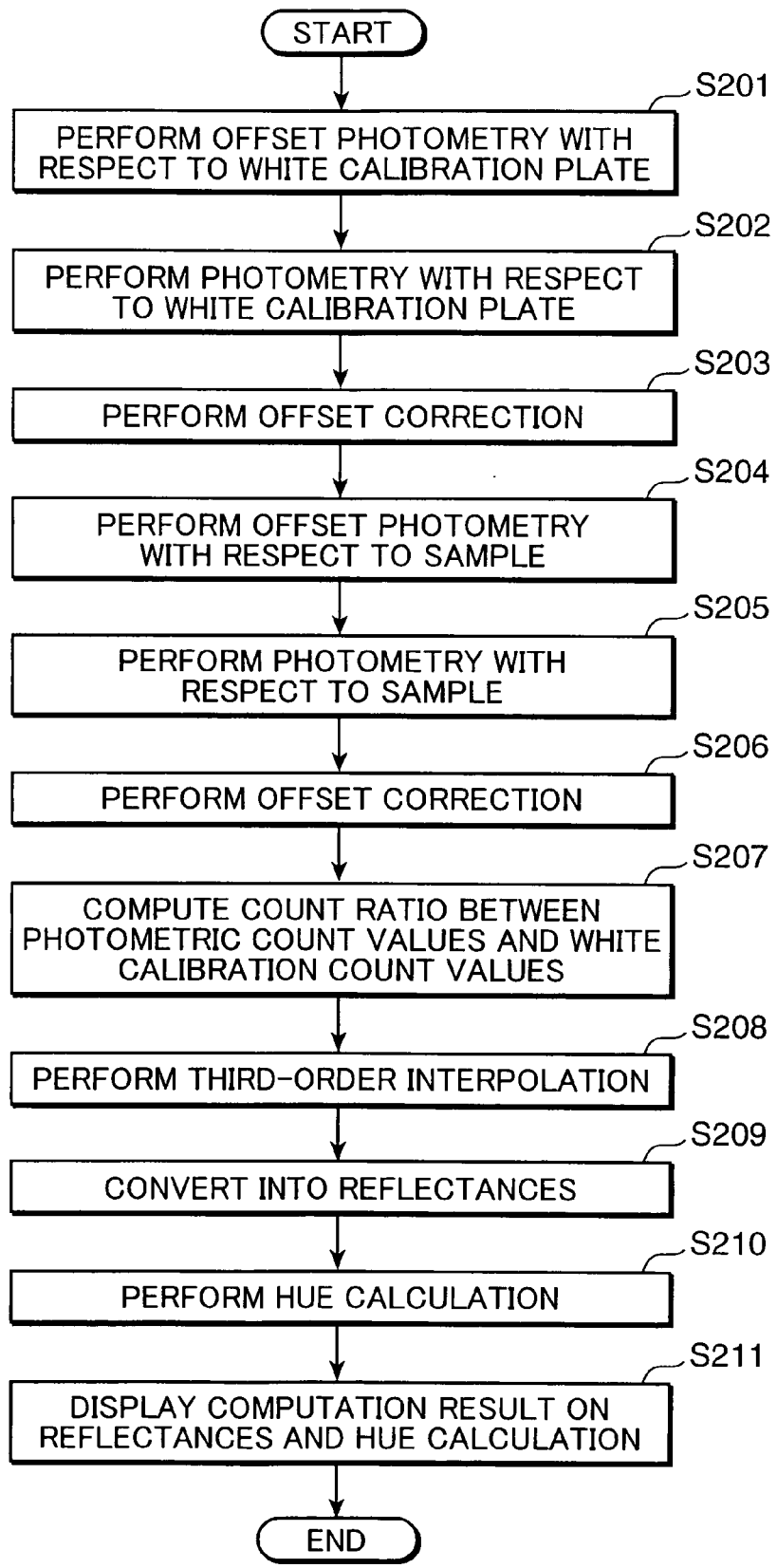
FIG. 5 is a flowchart showing a measuring method to be performed by the spectral characteristic measuring system.

Next, a method for measuring a spectral characteristic of the sample 24 by the spectral characteristic measuring apparatus 100 is described referring to FIG. 5. FIG. 5 is a flowchart showing a measuring method to be performed by the spectral characteristic measuring system of the first embodiment. Calibration before measurement is performed at first. Specifically, a white calibration plate as the sample 24 is placed in the spectral characteristic measuring system S shown in FIG. 1, and measurement of the white calibration plate is started by operating the measurement trigger 5. First, measurement is performed without irradiating illumination light in order to perform offset correction. In other words, offset photometry is performed with respect to the white calibration plate (Step S201). Specifically, in response to an input of a measurement start signal from the measurement trigger 5, the measurement controller 41 of the controlling section 4 controls the respective parts to perform a measuring operation. In the offset photometry, since illumination light is not irradiated, no light is reflected from the sample 24. In other words, measurement values corresponding to a state that the reflectance is zero are obtained. Electrical signals outputted in this state are successively inputted to the controlling section 4 and temporarily stored in the storing section 43.

Then, photometry with respect to the white calibration plate is performed in a state that illumination light is irradiated (Step S202). Specifically, the measurement controller 41 controls the light emitting circuit 1 to cause the white LED 21 and the purple LED 27 to emit white light and purple light. The white light is incident onto the reflection mirror 22 disposed above the white LED 21 and reflected thereon for incidence into the toroidal mirror 23. The purple light is directly incident onto the toroidal mirror 23. Then, the white light and the purple light are reflected on the toroidal mirror 23 and irradiated onto the white calibration plate as the sample 24. The white light and the purple light irradiated onto the sample 24 are reflected on the sample 24, and the reflection light is condensed on the lens 25 and combined into the optical fiber 26. Then, the reflection light is propagated through the optical fiber 26, and incident onto the diffraction grating 32 via the incident slit 31 of the spectral measuring section 3. The diffraction grating 32 separates the reflection light into light rays i.e. reflects the incident light rays at a different reflection angle in accordance with wavelengths for incidence into the light receiving line sensor 33. Thereby, the light rays are successively received on the light receiving elements, and outputted as electrical signals. The outputted electrical signals are inputted to the controlling section 4, and sent to the personal computer 6.

Measurement values obtained with use of the white calibration plate are used as reference values in spectral characteristic measurement. Specifically, the personal computer 6 performs offset correction by computing a difference between the measurement data obtained in Step S202, and the measurement data obtained in Step S201 (Step S203). Thereby, white calibration count values are stored in the personal computer 6.

Calibration before measurement by the spectral characteristic measuring system S of the first embodiment is completed by performing the operations from Step S201 through Step S203. Then, measurement of an actual sample 24 is started. First, similarly to Step S201, offset photometry is performed with respect to the actual sample 24 without irradiating illumination light (Step S204). Then, electrical signals are outputted from the light receiving elements of the light receiving line sensor 33 by the offset photometry. The outputted electrical signals are inputted to the controlling section 4 and sent to the personal computer 6 for storing.

Then, similarly to Step S202, photometry is performed with respect to the sample 24 in a state that illumination light is irradiated (Step S205). Then, electrical signals are outputted from the light receiving elements of the light receiving line sensor 33 by the photometry. The outputted electrical signals are inputted to the controlling section 4 and sent to the personal computer 6 for storing.

Then, the personal computer 6 performs offset correction with respect to the sample 24, based on the measurement data obtained in Step S204 and Step S205 (Step S206). Specifically, similarly to Step S203, photometric count values of the light receiving elements are obtained by computing a difference between the measurement data obtained in Step S205, and the measurement data obtained in Step S204. Further, the personal computer 6 computes a ratio (photometric count ratio) with respect to the sample 24 between the photometric count values obtained by the above operation, and the white calibration count values obtained in Step S203 (Step S207). The photometric count values of the light receiving elements are values corresponding to central wavelengths of the light receiving elements. Specifically, the photometric count values are values representing central wavelengths (combined central wavelengths) of the light receiving elements, which have been calculated based on combined sensitivities as calibration data. In view of this, third-order interpolation is performed to convert the measurement data into photometric count values at respective wavelengths (Step S208). The personal computer 6 calculates a reflectance Ref($\lambda$) of the sample 24 at each of the wavelengths, based on the photometric count values obtained at the respective wavelengths, the white calibration count values, and the like by implementing the equation (3) (Step S209).

$$\text{Ref}(\lambda) = (Cs(\lambda)/Cc(\lambda)) \cdot W(\lambda) \tag{3}$$

where Ref($\lambda$) is a reflectance of the sample 24, $Cs(\lambda)$ is a photometric count value with respect to the sample 24, $Cc(\lambda)$ is a white calibration count value, and $W(\lambda)$ is white calibration data which is stored in the storing section 43 at the time of shipment, and represents a true value of the white calibration plate.

Then, the personal computer 6 performs hue calculation based on the reflectances at the respective wavelengths (Step S210). Then, the personal computer 6 displays a result on the reflectances and the hue calculation (Step S211).

Figure 6:
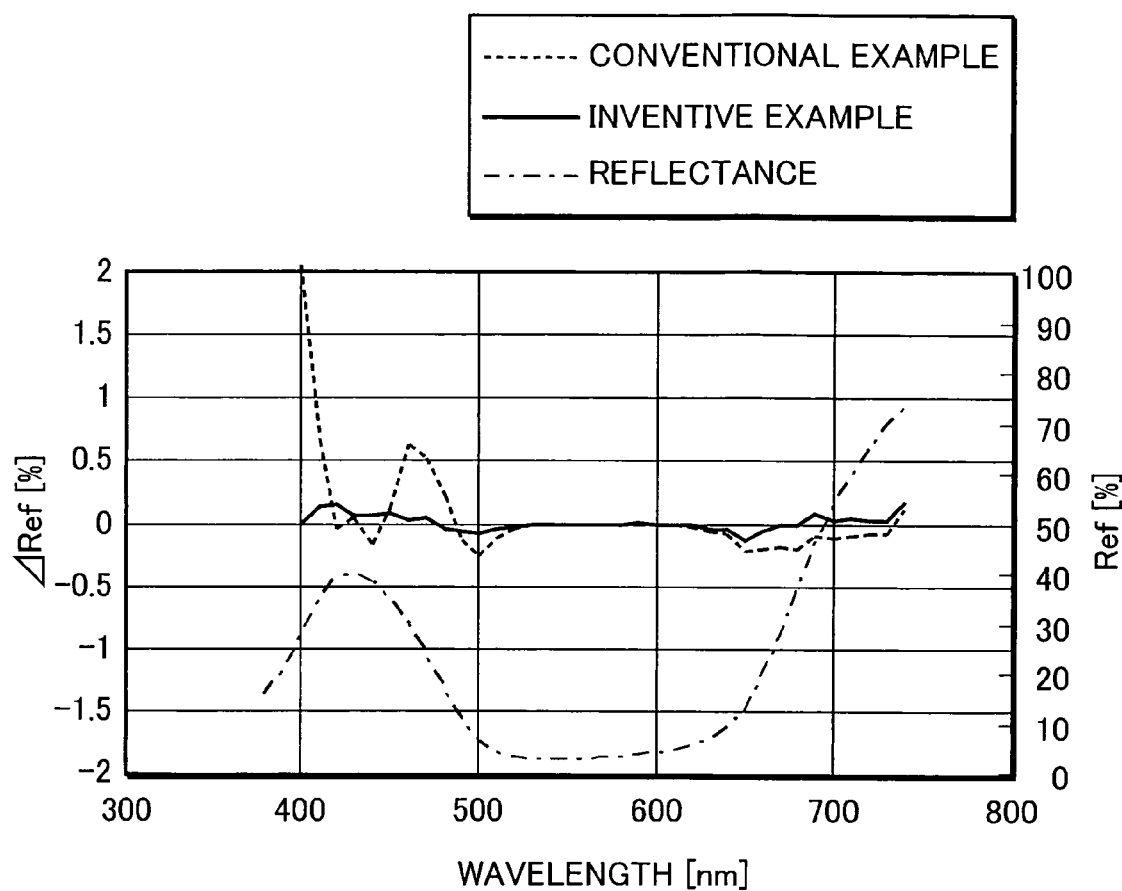
FIG. 6 is a graph showing performance evaluation results on the spectral characteristic measuring apparatus, and a conventional spectral characteristic measuring apparatus using a white LED.

Comparison between the spectral characteristic measuring system S of the first embodiment and a conventional spectral characteristic measuring system was made by actual measurement. FIG. 6 is a graph showing performance evaluation results on the spectral characteristic measuring apparatus of the first embodiment as an inventive example, and a conventional spectral characteristic measuring apparatus using a white LED as an illuminating section, as a conventional example. FIG. 6 shows a difference between measurement results by the spectral characteristic measuring apparatuses with respect to a sample 24, whose reflectance is known, and the known reflectance.

Referring to FIG. 6, the one-dotted chain line represents a reflectance Ref at each wavelength with respect to white light emitted from the white LED as an illuminating section, in other words, a spectral light intensity of illumination light. The broken line in FIG. 6 represents a reflectance difference $\Delta$Ref between the known reflectance, and a reflectance obtained by the conventional spectral characteristic measuring apparatus using a white LED as an illuminating section. The solid line in FIG. 6 represents a reflectance difference $\Delta$Ref between the known reflectance, and a reflectance obtained by the spectral characteristic measuring apparatus of the first embodiment. As shown in FIG. 6, in the conventional example indicated by the broken line, the reflectance difference is deviated from 0 percent in a portion where the reflectance is significantly changed with respect to the wavelength of the white LED, specifically, a range where the wavelength is about 500 nm or smaller. However, in the inventive example using the measuring apparatus of the first embodiment indicated by the solid line, the reflectance difference is substantially 0 percent in the entire wavelength region. Thus, the spectral characteristic measuring apparatus of the first embodiment performs reflectance measurement with high precision, even if a white LED is used as an illuminating section.

Alternatively, in the spectral characteristic measuring apparatus 100, combined sensitivities of the light receiving elements may be calculated by performing a weighting calculation with respect to combined sensitivities of a certain light receiving element, and light receiving elements adjacent thereto, in place of using a combined sensitivity of a single light receiving element. This is advantageous in enhancing the S/N ratio (signal to noise ratio). Combined sensitivities to be used in weighting calculation may include combined sensitivities of light receiving elements other than the light receiving elements adjacent to a certain light receiving element. Further alternatively, in the case where a weighting calculation is performed by e.g. using combined sensitivities of a light receiving element as a middle light receiving element, and light receiving elements adjacent thereto, the combined sensitivities of the adjacent light receiving elements may be multiplied by 0.25 as a weighting coefficient; and the combined sensitivity of the middle light receiving element may be multiplied by 0.5 as a weighting coefficient.

In the case where a spectral characteristic of a sample is measured by the spectral characteristic measuring apparatus 100 using a weighting calculation, in the calibration method shown in FIG. 4, after combined sensitivities are calculated in Step S103, central wavelengths may be calculated based on a weighted combined sensitivity calculated by a weighting calculation in Step S104. Specifically, weighted combined sensitivities may be obtained by implementing the equation (4).

$$T_n(\lambda) = W_1 f_{n-1}(\lambda) + W_2 f_n(\lambda) + W_1 f_{n+1}(\lambda) \tag{4}$$

where $T_n(\lambda)$ is a weighted combined sensitivity of the n-th light receiving element, $f_n(\lambda)$ is a combined sensitivity of the n-th light receiving element, $W_1$ is a weight to be multiplied with respect to a light receiving element adjacent to a light receiving element as a middle light receiving element, and $W_2$ is a weight to be multiplied with respect to the middle light receiving element.

Then, a central wavelength of each of the light receiving elements is obtained by using the weighted combined sensitivity $T_n(\lambda)$.

Next, described is a method for measuring a spectral characteristic of a sample by the spectral characteristic measuring apparatus 100, wherein central wavelengths based on weighted combined sensitivities obtained by a weighting calculation are stored. Referring back to the measurement method described referring to FIG. 5, after the white calibration count values are obtained in Step S203, the personal computer 6 performs a weighting calculation with respect to the white calibration count values. In this example, a weighted white calibration count value $Ct_n$ of the n-th light receiving element is obtained by implementing the equation (5).

$$Ct_n = W_1 C_{n-1} + W_2 C_n + W_1 C_{n+1} \tag{5}$$

where $Ct_n$ is a weighted white calibration count value of the n-th light receiving element, and $C_n$ is a white calibration count value of the n-th light receiving element.

The weighted white calibration count value $Ct_n$ of the light receiving element is stored in the personal computer 6.

Similarly to the white calibration count values, the personal computer 6 performs a weighting calculation with respect to the photometric count values of the light receiving elements, which have been obtained by offset correction in Step S206. Then, a photometric count ratio is obtained by calculating a ratio between the weighted photometric count values of the light receiving elements, and the weighted white calibration count values in Step S207.

As described above, in the spectral characteristic measuring system of the first embodiment, high-precision measurement can be performed by using a weighting calculation.

Second Embodiment

In this section, a spectral characteristic measuring system incorporated with a spectral characteristic measuring apparatus in accordance with the second embodiment of the invention is described. Since the arrangement of the spectral characteristic measuring system of the second embodiment is substantially the same as the arrangement of the spectral characteristic measuring system of the first embodiment, description thereof is omitted herein. In the description on the spectral characteristic measuring system of the second embodiment, elements in the second embodiment substantially equivalent or identical to those in the first embodiment are indicated with the same reference numerals, and are described referring to FIGS. 1 through 3. The spectral characteristic measuring apparatus 100 of the second embodiment is different from the spectral characteristic measuring apparatus 100 of the first embodiment in that the spectral characteristic measuring apparatus 100 of the second embodiment is operable to measure a spectral characteristic of a light emitting object such as a light source, in addition to a spectral characteristic of an object which does not emit light by itself.

Figure 7:
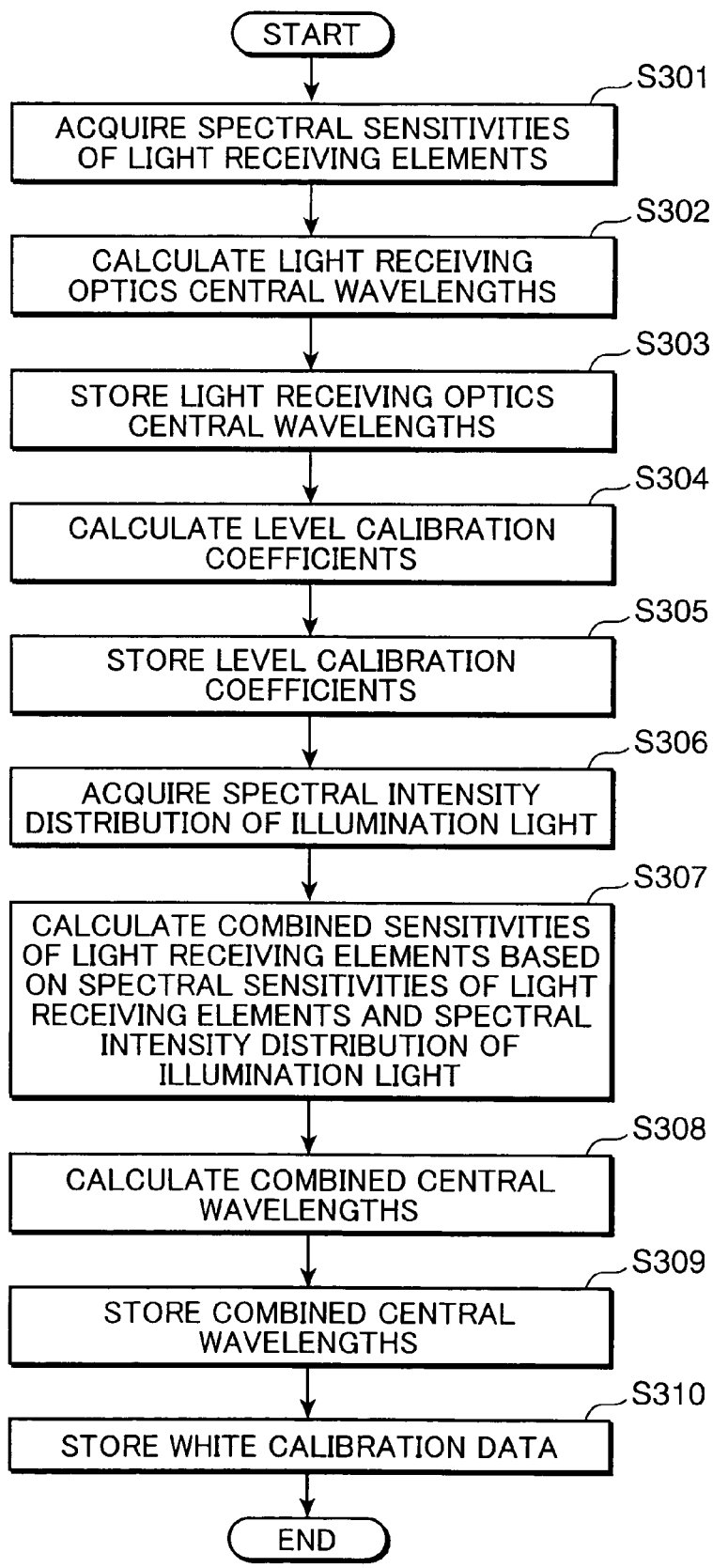
FIG. 7 is a flowchart showing a method for calibrating a spectral characteristic measuring apparatus in accordance with a second embodiment of the invention.

Firstly, a method for calibrating the spectral characteristic measuring apparatus 100 of the second embodiment at the time of shipment is described referring to FIG. 7. FIG. 7 is a flowchart showing a method for calibrating the spectral characteristic measuring apparatus of the second embodiment.

First, spectral sensitivities of light receiving elements of a light receiving line sensor 33 free from an influence of illumination light are acquired (Step S301). Specifically, monochromatic light rays of different wavelength components are successively outputted to a spectral measuring section 3 by a spectral illuminator capable of outputting monochromatic light rays each having a sufficiently small half bandwidth. Each of the monochromatic light rays is reflected on a diffraction grating 32 at a different angle in accordance with wavelengths, and irradiated onto each of light receiving elements of the light receiving line sensor 33. Upon irradiation of the monochromatic light rays, the light receiving elements output electrical signals. Spectral sensitivities of the light receiving elements are acquired by plotting the electrical signals from the light receiving line sensor 33.

Then, central wavelengths of the light receiving elements are calculated, using the acquired spectral sensitivities (Step S302). The central wavelengths calculated based on spectral sensitivities of the light receiving elements, without considering an influence of illumination light, are called as light-receiving-optics central wavelengths.

Then, the light-receiving-optics central wavelengths of the light receiving elements are stored in a storing section 43, as one of calibration data (Step S303). Then, level calibration coefficients are calculated (Step S304). Specifically, spectral measurement is performed without irradiating illumination light by using a light source for level calibration, whose spectral radiance is known, as a sample 24, and electrical signals to be outputted from the light receiving line sensor 33 are plotted. A computation processor 42 calculates level correction coefficients each showing a correlation between the known radiance and an electrical signal to be outputted from each of the light receiving elements, based on the above calibration data, and the level correction coefficients are stored in the storing section 43, as one of calibration data (Step S305). In other words, the level correction coefficients are used as reference data for calculating measurement values.

Then, a spectral intensity distribution of illumination light with respect to wavelengths is acquired (Step S306). Specifically, a spectral intensity distribution of illumination light with respect to wavelengths is acquired by measuring illumination light to be emitted from a white LED 21 and a purple LED 27, using a spectroradiometer or a like device.

Then, combined sensitivities are calculated, based on the spectral sensitivities of the light receiving elements acquired in Step S301, and the spectral intensity distribution of illumination light acquired in Step S306 (Step S307). The combined sensitivities are calculated by implementing the equation (1). Specifically, the combined sensitivities are calculated by multiplying a spectral intensity of illumination light with a spectral intensity of each of the light receiving elements. In this way, central wavelengths (combined central wavelengths) of the light receiving elements based on combined sensitivities are calculated, using the calculated combined sensitivities (Step S308). Each of the central wavelengths may be defined as a centroid of a spectral sensitivity characteristic of each of the light receiving elements. Specifically, combined central wavelengths are calculated by implementing the equation (2). Then, the combined central wavelengths calculated based on combined sensitivities are stored in the storing section 43, as one of calibration data (Step S309).

Then, white calibration data as data for calibration is stored in the storing section 43 (Step S310). The white calibration data is known, and is not data inherent to individual spectral characteristic measuring apparatuses, but is data inherent to individual white calibration plates.

Calibration of the spectral characteristic measuring apparatus 100 before shipment is completed by performing the above steps. As described above, in the spectral characteristic measuring apparatus 100 of the second embodiment, calibration data is stored in the storing section 43. The calibration data includes data relating to the light-receiving-optics central wavelengths of the light receiving elements obtained in Step S302, the combined central wavelengths of the light receiving elements based on combined sensitivities, which have been obtained considering the spectral intensity distribution of illumination light in Step S308, the level correction coefficients, and the white calibration data.

Figure 8:
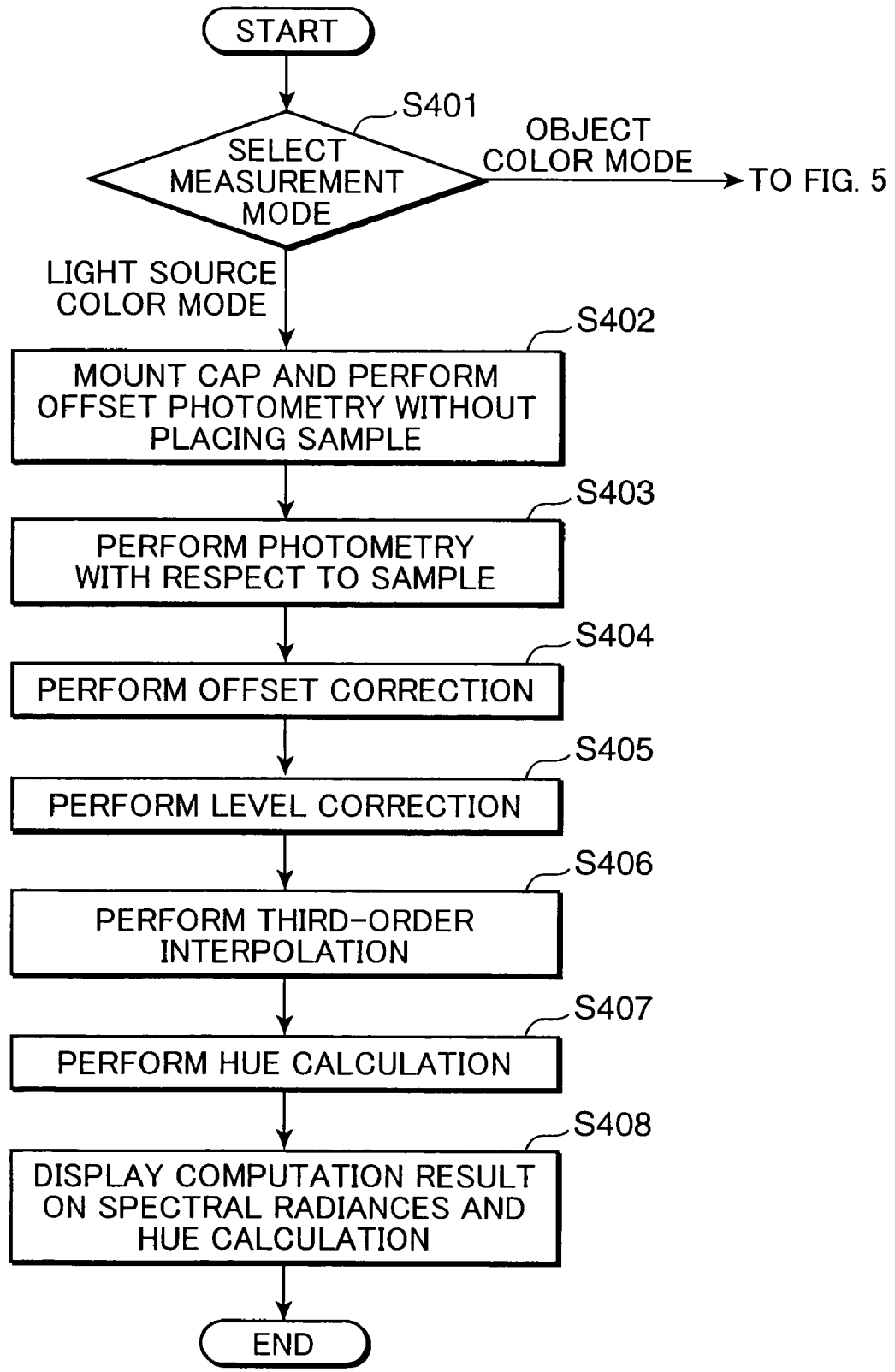
FIG. 8 is a flowchart showing a measuring method to be performed by the spectral characteristic measuring apparatus of the second embodiment.
Figure 9:
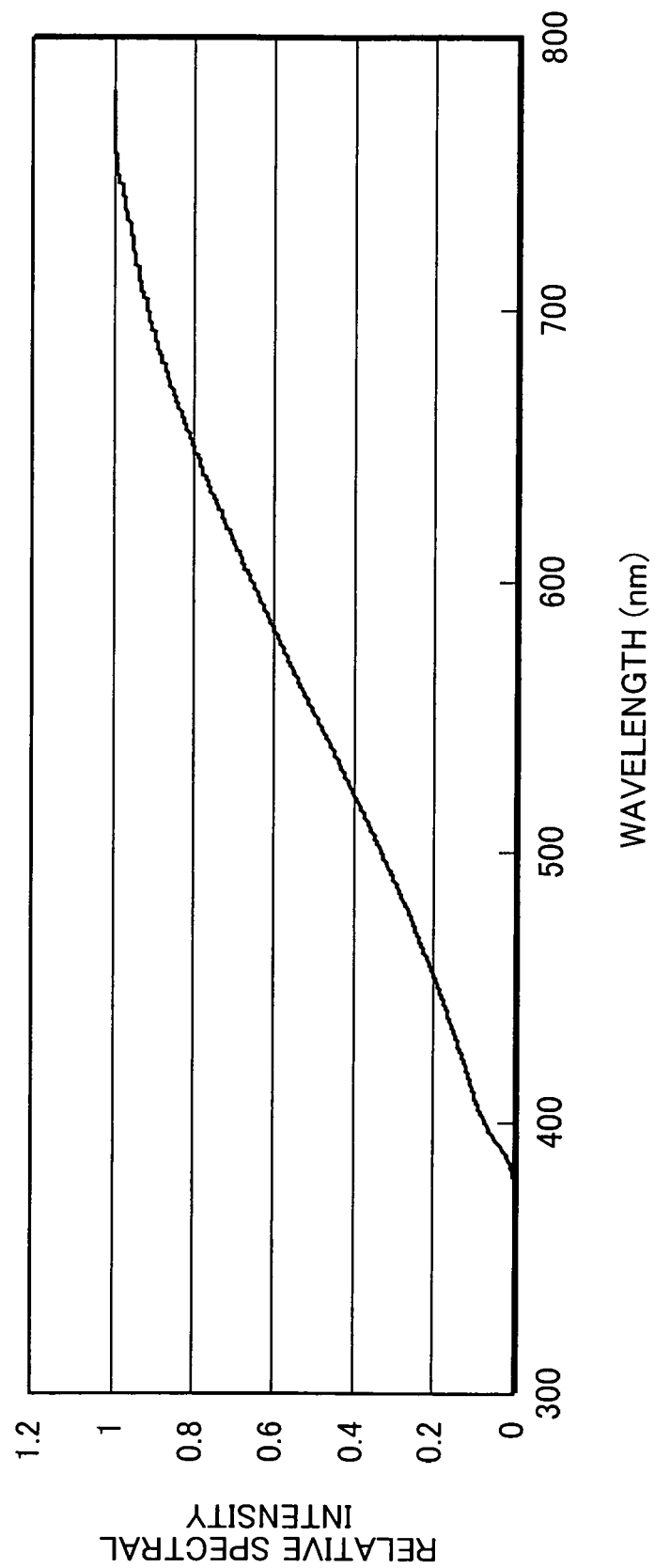
FIG. 9 is a graph showing a spectral intensity distribution of a tungsten lamp with respect to wavelengths.

Next, a method for measuring a spectral characteristic of a sample 24 by the spectral characteristic measuring apparatus 100 of the second embodiment is described referring to FIG. 8. FIG. 8 is a flowchart showing a measuring method to be performed by the spectral characteristic measuring apparatus of the second embodiment. As described above, the spectral characteristic measuring apparatus 100 of the second embodiment is operable to measure a spectral characteristic of a light emitting object such as a light source, in addition to an object which does not emit light by itself.

Operation methods are different between a case that an object which does not emit light by itself is selected as the sample 24, and a case that a light emitting object is selected as the sample 24. First, an operating method (measurement mode) is selected (Step S401). In the case where an object which does not emit light by itself is selected as the sample 24, measurement is performed according to the procedure of the flowchart shown in FIG. 5, as described in the first embodiment. Accordingly, description on the operating method in this case is omitted herein. Referring back to FIG. 5, the combined central wavelengths of the light receiving elements based on combined sensitivities, which have been calculated in Step S308, as calibration data, are used as the central wavelengths of the light receiving elements based on combined sensitivities, which are used in third-order interpolation in Step S208. White calibration data as calibration data is used as $W(\lambda)$ to be used in calculating reflectances at respective wavelengths in Step S209. Specifically, a personal computer reads out these calibration data from the storing section 43 in performing the computations.

On the other hand, in the case where a light emitting object such as a light source is selected as the sample 24 in Step S401, at first, a cap is mounted on a measuring section 2, and offset photometry is performed without placing the sample 24 and without irradiating illumination light to block incidence of external light (Step S402). In the case where a light emitting object such as a light source is used as the sample 24, there is no need of irradiating illumination light in measurement. Electrical signals outputted from the light receiving line sensor 33, as a result of the offset photometry, are inputted to a controlling section 4 and sent to the personal computer for storing. Then, the cap is dismounted, the sample 24 i.e. a light emitting object is placed in the spectral characteristic measuring apparatus 100, and photometry is performed with respect to the sample 24 without irradiating illumination light (Step S403). Data obtained by the photometry is sent to the personal computer 6 for storing.

Then, the personal computer 6 performs offset correction with respect to the sample 24, based on the measurement data obtained in Step S402 and Step S403 (Step S404). Specifically, photometric count values of the light receiving elements are obtained by calculating a difference between the measurement data obtained in Step S403, and the measurement data obtained in Step S402. Then, level correction is performed (Step S406). Specifically, a spectral radiance at a central wavelength of each of the light receiving elements is calculated. In this example, the spectral radiance $Rad(\lambda)$ is obtained by implementing the equation (6).

$$Rad(\lambda)=Cs(\lambda) \cdot Lcal(\lambda) \quad (6)$$

where $Rad(\lambda)$ is a spectral radiance of the sample 24, $Cs(\lambda)$ is a photometric count value with respect to the sample 24, and $Lcal(\lambda)$ is a level calibration coefficient with respect to the sample 24.

Level calibration coefficients as calibration data are necessary to implement the equation (6). In view of this, the personal computer 6 acquires the level calibration coefficients from the storing section 43.

The spectral radiances of the sample 24 with respect to the light receiving elements are values corresponding to the light-receiving-optics central wavelengths of the light receiving elements, which have been calculated in Step S302. In view of this, a third-order interpolation is performed to convert the measurement data into spectral radiances at the respective wavelengths (Step S406). The personal computer 6 performs hue calculation, based on the spectral radiances at the respective wavelengths (Step S407). Then, the personal computer 6 displays a result on the spectral radiances and the hue calculation (Step S408).

As described above, the spectral characteristic measuring system of the second embodiment is operable to measure both a spectral characteristic of an object which does not emit light by itself, and a spectral characteristic of a light emitting object, as the sample 24. In other words, the spectral characteristic measuring system is operable to measure both the color of a light source and the color of a reflective object. Also, high-precision measurement can be performed even if a white LED is used as an illuminating section. Further, since a white LED is used as an illuminating section, a long life of the illuminating section can be secured, and the illuminating section can be made compact and lightweight.

Third Embodiment

In this section, a spectral characteristic measuring system incorporated with a spectral characteristic measuring apparatus in accordance with the third embodiment of the invention is described. The spectral characteristic measuring system of the third embodiment is constructed in such a manner that central wavelengths (combined central wavelengths) of light receiving elements based on combined sensitivities, which is one of calibration data, are stored in an auxiliary recording medium readable by a personal computer, in place of a spectral characteristic measuring apparatus; the personal computer reads out the calibration data from the auxiliary recording medium and a storing section of the spectral characteristic measuring apparatus; and hue calculation or a like computation is performed using measurement data.

Since the arrangement of the spectral characteristic measuring system of the third embodiment is substantially the same as the arrangement of the spectral characteristic measuring system of the first embodiment, description thereof is omitted herein. In the description on the spectral characteristic measuring system of the third embodiment, elements in the third embodiment substantially equivalent or identical to those in the first embodiment are indicated with the same reference numerals, and are described referring to FIGS. 1 through 3.

A personal computer 6 of the spectral characteristic measuring system S of the third embodiment is connected to a spectral characteristic measuring apparatus 100 by e.g. an interface such as a USB. The personal computer 6 has a CPU for performing computations, and a storing section such as an ROM, an EEPROM, an RAM, or a flash memory. The personal computer 6 is further constructed in such a manner that an auxiliary recording medium such as a CD-ROM (Compact Disc Read Only Memory) or a memory card is detachably mountable, data is readable from the auxiliary recording medium, and data is writable into the auxiliary recording medium. In this arrangement, data necessary for computation is readable from the auxiliary recording medium by mounting the auxiliary recording medium recorded with data to be used in computation by the personal computer 6 on the personal computer 6, or data computed by the personal computer 6 is storable in the auxiliary recording medium. Similarly to the second embodiment, the spectral characteristic measuring system of the third embodiment is operable to measure a spectral characteristic of a light emitting object such as a light source, in addition to a spectral characteristic of an object which does not emit light by itself.

A method for calibrating the spectral characteristic measuring apparatus 100 of the spectral characteristic measuring system S in the third embodiment at the time of shipment is described referring to a flowchart shown in FIG. 7. The calibration method of the third embodiment is substantially the same as the calibration method of the second embodiment except for the following. Specifically, in the second embodiment, the combined central wavelengths based on calculated combined sensitivities are stored in the storing section 43 in Step S309 in FIG. 7. In the third embodiment, combined central wavelengths based on calculated combined sensitivities are stored in the auxiliary recording medium readable by the personal computer 6, in place of a storing section 43 (see Step S309). Thus, the spectral characteristic measuring apparatus and the auxiliary recoding medium recorded with combined central wavelengths based on combined sensitivities are operated as one unit.

In the spectral characteristic measuring system S of the third embodiment, the spectral characteristic measuring apparatus 100, and the personal computer 6 in which a program for performing computations such as hue calculation is installed are connected to each other. The personal computer 6 is detachably mounted with the auxiliary recording medium constituting a unit with the spectral characteristic measuring apparatus. The personal computer 6 is operable to perform hue calculation by reading out the data recorded in the auxiliary recording medium, and using measurement data and other calibration data stored in the spectral characteristic measuring apparatus.

Specifically, since the spectral characteristic measuring method to be performed by the spectral characteristic measuring system S of the third embodiment is substantially the same as the spectral characteristic measuring method of the second embodiment, the spectral characteristic measuring method of the third embodiment is performed according to the procedures of the flowcharts shown in FIGS. 8 and FIG. 5, except for the following. Specifically, combined central wavelengths of the light receiving elements based on combined sensitivities, which is one of calibration data, and is used in computation by the personal computer 6, are read out from the auxiliary recording medium, in place of the storing section 43. Alternatively, combined central wavelengths of the light receiving elements based on combined sensitivities may be stored in the storing section of the personal computer 6, in installing a program for performing computations such as hue calculation in the personal computer 6. In the modification, the spectral characteristic measuring apparatus 100 is connected to the personal computer 6, without using the auxiliary recording medium. In response to start of measurement, and receiving measurement data, the personal computer 6 performs hue calculation by using combined central wavelengths of the light receiving elements based on combined sensitivities, which are stored in the storing section of the personal computer 6.

The embodiments have been described as above, but the embodiments are not limited to the foregoing calibration methods and measuring methods. As far as a calibration method or a measuring method includes steps of acquiring a spectral intensity distribution of illumination light with respect to wavelengths, and using combined central wavelengths calculated based on the spectral intensity distribution, any method other than the above calibration methods and measuring methods may be used.

For instance, JP 2005-69784A discloses a spectral characteristic measuring system incorporated with a UV (Ultraviolet)-LED as a light source for use in detecting and correcting a wavelength. JP Hei 10-508984A (tokuhyo) discloses a spectral characteristic measuring system for performing temperature correction. Performing calibration and measurement by the spectral characteristic measuring system, using central wavelengths calculated based on a spectral intensity distribution of illumination light with respect to wavelengths, enables to perform high-precision measurement, even if a white LED or a like device is used as an illuminating section.

Figure 10:
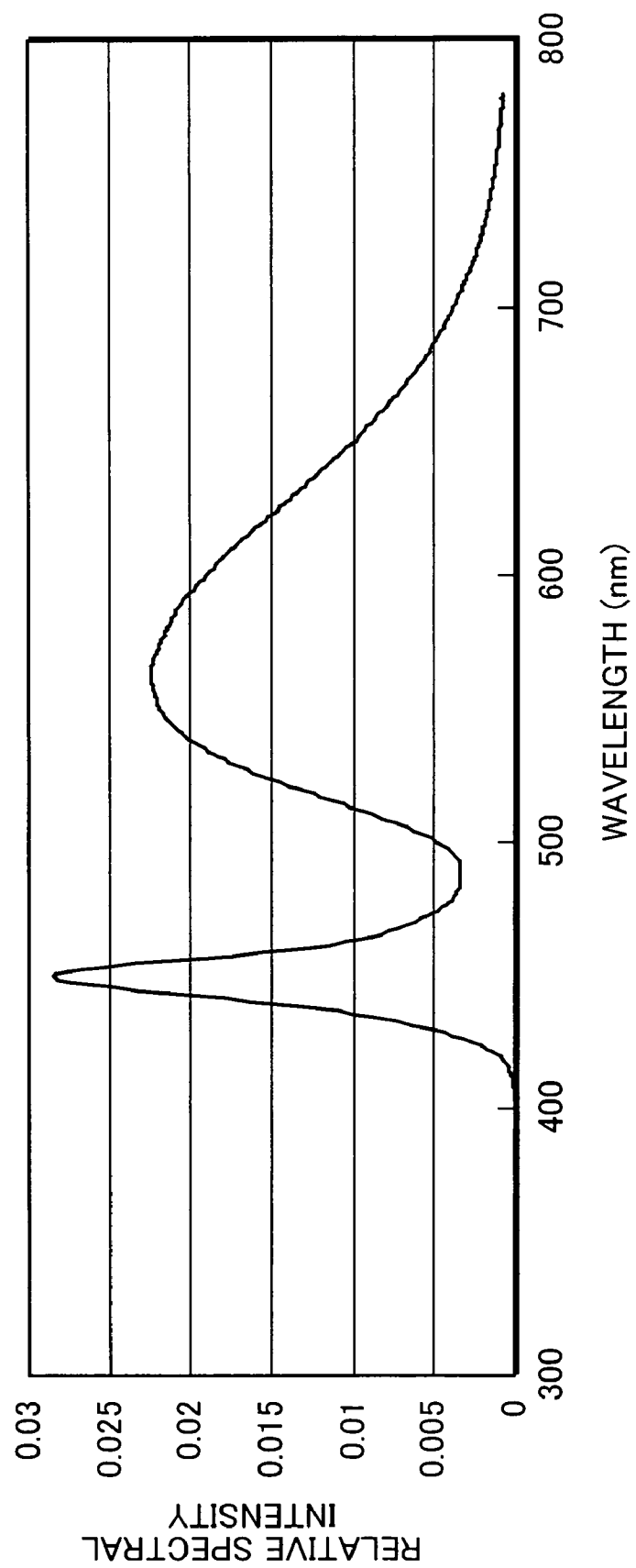
FIG. 10 is a graph showing a spectral intensity distribution of a white LED with respect to wavelengths.
Figures 14A, 14B:
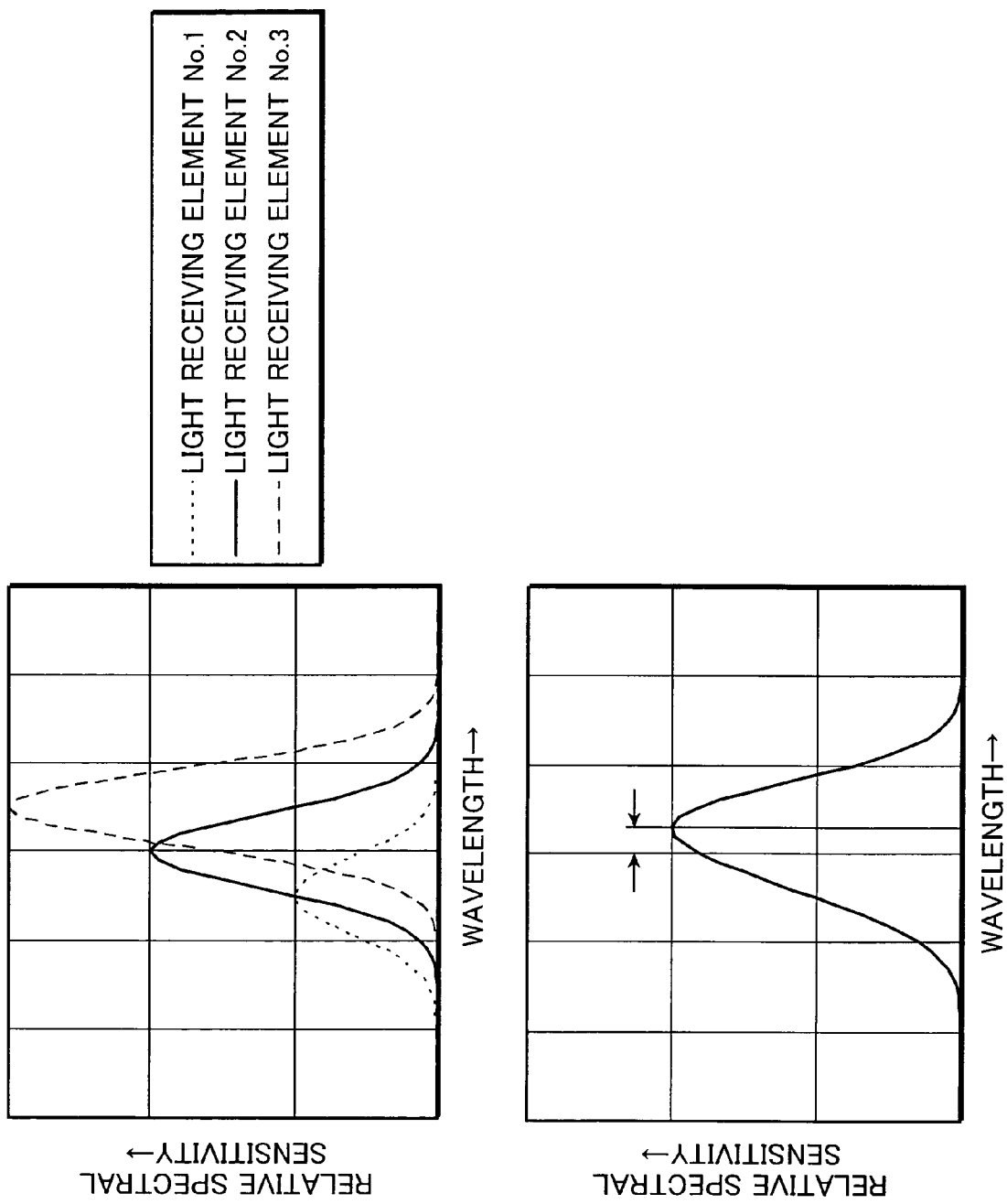

An illuminating section is not limited to a white LED having a characteristic as shown in FIG. 10. For instance, there are three types of LEDs for emitting white light. Specifically, the first type of LED is operable to generate white light by irradiating blue light from a blue LED chip onto a fluorescent material, while outputting yellow light, and mixing the blue light and the yellow light; the second type of LED is operable to generate white light by irradiating light from a near ultraviolet LED chip onto plural kinds of fluorescent materials, and mixing light of different colors; and the third type of LED is operable to generate white light by simultaneously irradiating red light, green light, and blue light from respective light emitting diodes, and mixing the red light, green light, and the blue light. Any one of the LEDs is usable as the illuminating section in the embodiments. With use of any one of the LEDs, high-precision measurement can be performed.

The following is a summary of the embodiments.

A characteristic measuring apparatus according to an aspect of the invention includes: an illuminating section for irradiating illumination light onto a sample; a spectral section for separating light from the sample irradiated with the illumination light into light rays in accordance with wavelengths; a light receiving section including a plurality of light receiving elements for receiving the light rays separated by the spectral section in accordance with wavelengths, and converting the received light rays into electrical output signals; and a storing section for storing a combined central wavelength of each of the light receiving elements calculated in advance based a spectral intensity distribution of the illumination light.

In the above arrangement, since the storing section stores in advance the central wavelengths (combined central wavelengths) of the light receiving elements obtained by actual measurement, a spectral characteristic of the sample can be accurately measured by performing computation based measurement values and the stored central wavelengths, even if a spectral intensity distribution of illumination light with respect to the wavelengths is sharp.

In the spectral characteristic measuring apparatus, preferably, the combined central wavelength may be calculated based on a combined sensitivity of the each light receiving element calculated based on the spectral intensity distribution of the illumination light and a spectral sensitivity of the each light receiving element.

In the above arrangement, the central wavelengths stored in the storing section are used as central wavelengths of the light receiving elements in actual measurement. Accordingly, a spectral characteristic of the sample can be accurately measured.

In the spectral characteristic measuring apparatus, preferably, the combined sensitivity of the each light receiving element may be calculated with reference to the combined sensitivities of the light receiving elements disposed in the vicinity of the each light receiving element.

In the above arrangement, since the electrical signals outputted from the light receiving elements are processed by a weighting calculation, the S/N ratio (signal to noise ratio) can be enhanced. Further, since the central wavelengths are used as central wavelengths of the light receiving elements at the time of actual measurement, a spectral characteristic of the sample can be accurately measured.

Preferably, in the spectral characteristic measuring apparatus, the storing section may further store a light-receiving-optics central wavelength of the each light receiving element calculated in advance based on a spectral sensitivity of the each light receiving element, and a level correction coefficient as a reference value to be used in calculating a measurement value for measuring a color of a light source.

In the above arrangement, the spectral characteristic measuring apparatus can measure the color of a light source, as well as the color of an object.

In the spectral characteristic measuring apparatus, preferably, the illuminating section may include a white light emitting diode.

The above arrangement enables to secure a long life of the illuminating section, and make the illuminating section compact and lightweight.

A method for calibrating a spectral characteristic measuring apparatus according to another aspect of the invention is constructed to irradiate illumination light onto a sample, separate light from the sample irradiated with the illumination light into light rays in accordance with wavelengths, receive the light rays on a plurality of light receiving elements in accordance with wavelengths, and convert the received light rays into electrical output signals. The method includes: a step of acquiring a spectral sensitivity of each of the light receiving elements; a step of acquiring a spectral intensity distribution of the illumination light with respect to the light receiving elements; a step of calculating a combined sensitivity of the each light receiving element, based on the acquired spectral sensitivity of the each light receiving element and the acquired spectral intensity distribution of the illumination light; a step of calculating a combined central wavelength of the each light receiving element based on the combined sensitivity of the each light receiving element; and a step of storing the combined central wavelengths into the spectral characteristic measuring apparatus.

In the above arrangement, calibration for accurate spectral characteristic measurement can be performed without an influence of a spectral intensity distribution of illumination light in measurement, even if the spectral intensity distribution of illumination light with respect to the wavelengths is sharp.

A spectral characteristic measuring system according to yet another aspect of the invention includes: an illuminating section for irradiating a sample with illumination light; a spectral section for separating light from the sample irradiated with the illumination light into light rays in accordance with wavelengths; a light receiving section including a plurality of light receiving elements for receiving the light rays separated by the spectral section in accordance with wavelengths, and converting the received light rays into electrical output signals; and a computing section for calculating a spectral characteristic of the sample, using an output from the light receiving elements, and a combined central wavelength of each of the light receiving elements calculated in advance based a spectral intensity distribution of the illumination light. The computing section may be e.g. a personal computer.

As described above, the spectral characteristic measuring system includes: the spectral characteristic measuring apparatus provided with the illuminating section, the spectral section, and the light receiving section; and the computing section. In this arrangement, since a spectral characteristic of the sample is calculated by using the central wavelengths (combined central wavelengths) of the light receiving elements obtained by actual measurement, and measurement values, the spectral characteristic of the sample can be accurately measured, even if the spectral intensity distribution of illumination light with respect to the wavelengths is sharp.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A spectral characteristic measuring apparatus comprising:
    an illuminating section for irradiating illumination light onto a sample;
    a spectral section for separating light from the sample irradiated with the illumination light into light rays in accordance with wavelengths;
    a light receiving section including a plurality of light receiving elements for receiving the light rays separated by the spectral section in accordance with wavelengths, and converting the received light rays into electrical output signals; and
    a storing section for storing a combined central wavelength of each of the light receiving elements calculated in advance based on a spectral intensity distribution of the illumination light.

2. The spectral characteristic measuring apparatus according to claim 1, wherein
    the combined central wavelength is calculated based on a combined sensitivity of the each light receiving element calculated based on the spectral intensity distribution of the illumination light and a spectral sensitivity of the each light receiving element.

3. The spectral characteristic measuring apparatus according to claim 2, wherein
    the combined sensitivity of the each light receiving element is calculated with reference to the combined sensitivities of the light receiving elements disposed in the vicinity of the each light receiving element.

4. The spectral characteristic measuring apparatus according to claim 1, wherein
    the storing section further stores
    a light-receiving-optics central wavelength of the each light receiving element calculated in advance based on a spectral sensitivity of the each light receiving element, and
    a level correction coefficient as a reference value to be used in calculating a measurement value for measuring a color of a light source.

5. The spectral characteristic measuring apparatus according to claim 1, wherein
    the illuminating section includes a white light emitting diode.

6. A method for calibrating a spectral characteristic measuring apparatus constructed to irradiate illumination light onto a sample, separate light from the sample irradiated with the illumination light into light rays in accordance with wavelengths, receive the light rays on a plurality of light receiving elements in accordance with wavelengths, and convert the received light rays into electrical output signals, the method comprising:
    a step of acquiring a spectral sensitivity of each of the light receiving elements;
    a step of acquiring a spectral intensity distribution of the illumination light with respect to the light receiving elements;

a step of calculating a combined sensitivity of the each light receiving element based on the acquired spectral sensitivity of the each light receiving element and the acquired spectral intensity distribution of the illumination light;

a step of calculating a combined central wavelength of the each light receiving element based on the combined sensitivity of the each light receiving element; and a step of storing the combined central wavelengths into the spectral characteristic measuring apparatus.

7. A spectral characteristic measuring system comprising:

an illuminating section for irradiating illumination light onto a sample;

a spectral section for separating light from the sample irradiated with the illumination light into light rays in accordance with wavelengths;

a light receiving section including a plurality of light receiving elements for receiving the light rays separated by the spectral section in accordance with wavelengths, and converting the received light rays into electrical output signals; and a computing section for calculating a spectral characteristic of the sample using an output from the light receiving elements, and a combined central wavelength of each of the light receiving elements calculated in advance based on a spectral intensity distribution of the illumination light.

* * * * *